(12) United States Patent
Alderson et al.

(10) Patent No.: US 9,377,375 B2
(45) Date of Patent: Jun. 28, 2016

(54) REPETITIVE SHOCK VIBRATION TESTING SYSTEM AND METHOD

(75) Inventors: John Alderson, Holland, MI (US); Joseph D. Wetzel, Hudsonville, MI (US)

(73) Assignee: Venturedyne, Ltd., Pewaukee, WI (US)

( * ) Notice: Subject to any disclaimer, the term of this patent is extended or adjusted under 35 U.S.C. 154(b) by 416 days.

(21) Appl. No.: 13/472,880

(22) Filed: May 16, 2012

(65) Prior Publication Data

US 2013/0305828 A1 Nov. 21, 2013

(51) Int. Cl.
*G01M 7/08* (2006.01)
*G01M 7/02* (2006.01)

(52) U.S. Cl.
CPC ..................... *G01M 7/022* (2013.01)

(58) Field of Classification Search
CPC ......... G01M 7/027; G01M 7/06; G01M 7/02; G01M 7/00; G01M 7/08; G01N 29/045
USPC ................................... 73/663–668
See application file for complete search history.

(56) References Cited

U.S. PATENT DOCUMENTS

| | | | |
|---|---|---|---|
| 3,477,281 A * | 11/1969 | Helmuth | 73/664 |
| 3,654,804 A * | 4/1972 | Helmuth | 73/664 |
| 3,710,082 A | 1/1973 | Sloane et al. | |
| 3,800,588 A | 4/1974 | Larson et al. | |
| 4,164,151 A | 8/1979 | Nolan et al. | |
| 4,181,025 A | 1/1980 | Abstein, Jr. et al. | |
| 4,181,026 A | 1/1980 | Abstein, Jr. et al. | |
| 4,181,027 A | 1/1980 | Talbott, Jr. | |
| 4,181,028 A | 1/1980 | Talbott, Jr. | |
| 4,181,029 A | 1/1980 | Talbott, Jr. | |
| 4,527,770 A | 7/1985 | Vanderburg | |
| 4,548,067 A | 10/1985 | Cox | |

(Continued)

FOREIGN PATENT DOCUMENTS

| | | |
|---|---|---|
| GB | 2019526 | 10/1979 |
| JP | 60164520 | 8/1985 |

(Continued)

OTHER PUBLICATIONS

Translation of SU507793.pp. 1-5.*

(Continued)

*Primary Examiner* — Hezron E Williams
*Assistant Examiner* — Nashmiya Fayyaz
(74) *Attorney, Agent, or Firm* — Michael Best & Friedrich LLP

(57) ABSTRACT

In operating a vibration testing system, a table is provided with a plurality of distinct regions, and each of the plurality of distinct regions is provided with at least one vibrator of the plurality of vibrators and at least one accelerometer of the plurality of accelerometers. Target vibration strengths are set for each region, and the vibrators are operated. Local vibration strength is measured at each distinct region with the corresponding accelerometer(s) of the plurality of accelerometers. A signal corresponding to each of the measured local vibration strengths is provided to a controller. An individual vibrator control signal is calculated for each distinct region based on the corresponding measured local vibration strength and the corresponding target vibration strength. The individual control signals are provided from the controller to control the vibrator(s) of each distinct region to achieve the target vibration strength at each of the distinct table regions.

29 Claims, 8 Drawing Sheets

(56) References Cited

U.S. PATENT DOCUMENTS

| | | |
|---|---|---|
| 4,557,136 A | 12/1985 | Greenhalf |
| 4,735,089 A | 4/1988 | Baker et al. |
| 5,412,991 A | 5/1995 | Hobbs |
| 5,517,857 A | 5/1996 | Hobbs |
| 5,589,637 A | 12/1996 | Hobbs |
| 5,594,177 A | 1/1997 | Hanse |
| 5,713,240 A | 2/1998 | Engelmann |
| 5,744,724 A | 4/1998 | Hobbs |
| 5,804,732 A | 9/1998 | Wetzel et al. |
| 5,836,202 A | 11/1998 | Hobbs |
| 5,979,242 A | 11/1999 | Hobbs |
| 6,044,710 A * | 4/2000 | Kurita et al. ............... 73/664 |
| 6,105,433 A | 8/2000 | Hess |
| 6,112,596 A * | 9/2000 | Hess ............................. 73/663 |
| 6,189,385 B1 | 2/2001 | Horiuchi et al. |
| 6,220,100 B1 | 4/2001 | Felkins et al. |
| 6,422,083 B1 | 7/2002 | Hobbs |
| 6,446,508 B1 | 9/2002 | Peterson et al. |
| 6,502,464 B1 | 1/2003 | Hobbs |
| 6,718,270 B2 | 4/2004 | Horiuchi et al. |
| 6,766,695 B2 | 7/2004 | Hwang |
| 6,984,974 B2 | 1/2006 | Liken et al. |
| 7,134,344 B2 | 11/2006 | Kurt-Elli |
| 7,136,769 B2 | 11/2006 | Porter et al. |
| 7,299,698 B2 | 11/2007 | Hobbs |
| 7,752,914 B2 | 7/2010 | Alderson et al. |
| 7,861,594 B2 | 1/2011 | Wetzel et al. |
| 8,276,873 B2 * | 10/2012 | Ryaboy et al. ............... 248/638 |
| 2003/0172739 A1 | 9/2003 | Horiuchi et al. |
| 2009/0056457 A1 | 3/2009 | Wetzel |
| 2009/0223298 A1 | 9/2009 | Hanse |
| 2009/0260444 A1 * | 10/2009 | Beavers et al. ............... 73/665 |
| 2010/0305886 A1 | 12/2010 | Zhuge |
| 2011/0071778 A1 | 3/2011 | Schierenbeck |

FOREIGN PATENT DOCUMENTS

| | | | |
|---|---|---|---|
| JP | 2001201427 A | * | 7/2001 |
| SU | 507793 A | * | 4/1976 |
| WO | 2009064506 | | 5/2009 |

OTHER PUBLICATIONS

Mercado et al., "Modern Day Quasi-Random Vibration," EE—Evaluation Engineering, Jul. 1993.

Admitted Prior Art Vibration Testing System and Method—Sketch and Statement of Relevance attached, 1 pg, on sale or in public use at least one year prior to May 16, 2012.

John Hess, "Real-Time Monitoring and Analysis of Pneumatic Vibration Test Systems Actuators," Equipment Reliability Institute ERI News, May 2004, Vol. 15, http://www.vibrationandshock.com/news15/n115.htm.

GB1307145.1 United Kingdom Search Report dated Jul. 30, 2013 (1 page).

R C Page (Reliability Plus) and R H Weinmann (Screening Systems, Inc.), "Stressing the Difference—Quasi Random vs. Repetitive Shock Vibration", dated Feb. 2005.

Design Environmental, Screening Systems, Inc. Presentation on "Highly Accelerated Life Test and Highly Accelerated Stress Screen", publicly available prior to May 16, 2011.

QualMark Corporation, Inc. Presentation "Accelerated Testing From Conception to Application", dated 2004.

QualMark Corporation, Inc. Presentation "Ask the Experts", dated May 22, 2006.

* cited by examiner

REPETITIVE SHOCK VIBRATION TESTING SYSTEM AND METHOD

BACKGROUND

The present invention relates to vibration systems such as repetitive shock (RS) vibration systems. An RS vibration system may be a six degree-of-freedom table movably mounted on a base and provided with a series of impactors or vibrators configured to impose a desired vibration on the table (e.g., for stressing one or more products mounted on the table during a product test cycle).

In some known vibrator systems, one or more accelerometers are provided on the table and used to influence a control signal for the vibrators in the system. As described in U.S. Pat. No. 6,220,100, the outputs of multiple accelerometers mounted across the table are averaged and the average output is used as a control parameter for setting a single control signal sent to all of the vibrators. However, this concedes that the vibration response at various points on the table is uneven, necessitating the averaging of multiple accelerometer outputs to produce a useful control signal. While this approach can have the effect of centering the vibration response of multiple vibrators about a target, it will not tighten the overall dispersion since it is limited to providing one all-encompassing control signal to all the system vibrators, which may not have identical output when stimulated with identical control signals.

In another known vibration system, disclosed in U.S. Pat. No. 7,752,914, individual vibrator performance is accounted for by monitoring air pressure values, for example, between each vibrator and a corresponding valve upstream of the vibrator. With this information, the control system can account for variance in vibrator efficiencies so that all the vibrators in the system operate with substantial uniformity.

In another known vibration system, vibrator control valves are provided for the vibrators provided on a vibration table. During an initial test setup procedure, a dummy load can be placed on the table, along with several accelerometers. The vibrators are operated and vibration strength data is collected from the accelerometers. Fixturing, load placement, and accelerometer position are adjusted iteratively by a highly skilled operator to get a coarse adjustment for uniform vibration response. When reasonable results are achieved, adjustment factors are determined for each of the vibrator control valves in an attempt to fine-tune the system for its best possible uniformity or vibration response for the particular load scenario. Then the test is run, using a single control signal averaged from multiple accelerometers, with the corresponding preset adjustment factors being applied to the vibrator control valves throughout. The test must be stopped for re-calibration of the system to correct any changes or degradation in performance.

Over the years, considerable resources have also been spent by those of skill in the art to develop tables with increased vibration uniformity through complex structures. Despite advances through mechanical development, one or more of uneven table loading (by the product or products being tested), variance in individual vibrator efficiencies, and variance in transfer efficiencies between individual vibrators and the table can cause a significant disparity between the desired vibration strength across the table and the actual vibration strength across the table when utilizing a control system with the limitations of those currently known in the art.

SUMMARY

In view of the known vibration systems, there still exists a need for a vibration system that can achieve a target vibration level uniformly across the table, despite one or more of uneven table loading (by the product or products being tested), variance in individual vibrator efficiencies, and variance in transfer efficiencies between individual vibrators and the table.

In one aspect, the invention provides a method of operating a vibration testing system including a table configured to receive at least one product for testing, a plurality of vibrators coupled to the table, and a plurality of accelerometers. The table is provided with a plurality of distinct regions, and each of the plurality of distinct regions is provided with at least one vibrator of the plurality of vibrators and an accelerometer of the plurality of accelerometers. The at least one product is secured to the table. A target vibration strength is set for each of the plurality of distinct regions. The plurality of vibrators is operated to induce repetitive shock on the table and the at least one product received by the table. Local vibration strength is measured at each of the plurality of distinct regions with the corresponding accelerometer of the plurality of accelerometers. A signal corresponding to each of the measured local vibration strengths is provided to a controller. An individual control signal is calculated for the at least one vibrator of each distinct region based on the corresponding measured local vibration strength and the corresponding target vibration strength. The individual control signals are provided from the controller to control the at least one vibrator of each distinct region to achieve the target vibration strength at each of the plurality of distinct regions of the table.

In another aspect, the invention provides a vibration testing system including a table configured to receive at least one product for testing, a plurality of vibrators attached to the table and configured to induce repetitive shock on the table, vibrators being arranged with at least one vibrator in each distinct region, a plurality of accelerometers, each configured to measure local vibration strength at one of the plurality of distinct regions, and a controller coupled to the plurality of vibrators and the plurality of accelerometers. The controller is configured to receive a target vibration strength for each of the plurality of distinct regions of the table, to receive a signal corresponding to each of the measured local vibration strengths from each of the plurality of accelerometers, to calculate a plurality of independent, region-specific vibrator control signals based on the corresponding measured local vibration strength and the corresponding target vibration strength, and to provide the plurality of vibrator control signals to control the plurality of vibrators to achieve the target vibration strength at each of the plurality of distinct regions of the table.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
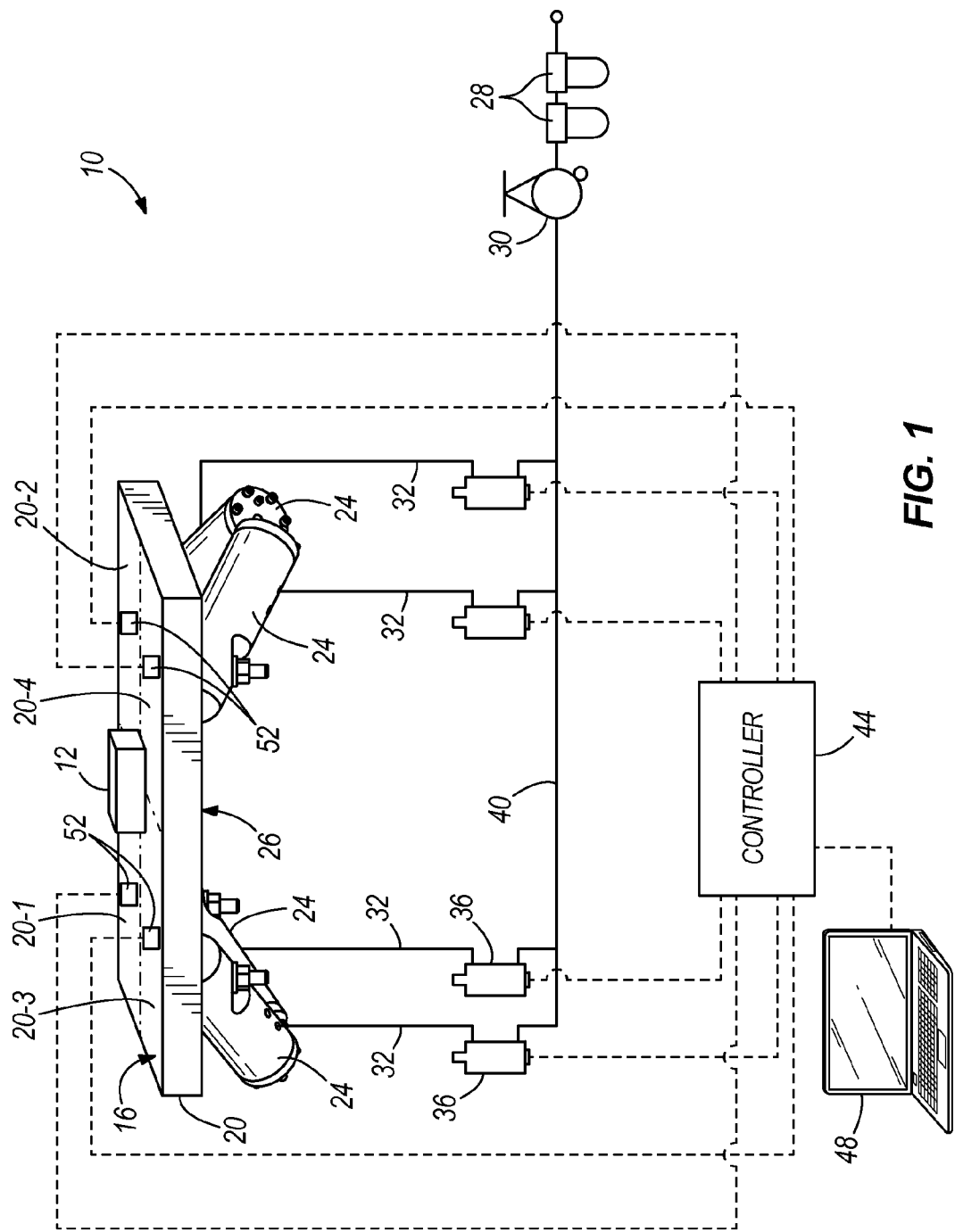
FIG. 1 is a schematic view of a vibration testing system, according to one construction of the invention.

FIG. 1 illustrates a vibration testing system 10 for performing a vibration or repetitive shock test on one or more products 12. The system 10 can be a six degree-of-freedom vibration testing system. In the illustrated system 10, a single product 12 is shown, and is secured to a surface 16 of a table frame 20 (or simply "table"). The product(s) 12 can be arranged at any position and in any orientation on the table 20. In some constructions, the table 20 can be similar to or identical to the structure disclosed in U.S. Pat. No. 7,784,349, the entire contents of which are hereby incorporated by reference. A plurality of vibrators 24 are coupled to the table 20, at a surface 26 opposite the surface 16, to induce repetitive shock on the table 20 and the product(s) 12 supported by the table 20. The illustrated vibrators 24 are pneumatically-powered. FIG. 1 illustrates a pneumatic air supply 28 and a regulator 30 that regulates the air from the air supply 28 to a predetermined supply pressure. Air at the predetermined supply pressure is provided to individual supply lines 32 for each of the vibrators 24. In the illustrated construction, a throttling device 36 (e.g., an electronically-controlled solenoid valve) provides bursts of pressurized air to each of the supply lines 32 from a supply header 40 to power the vibrators 24. In other constructions, the vibrators 24 can be hydraulically or electrically powered, and the throttling devices 36 can be any appropriate valve or device capable of being electronically-controlled to manipulate the output of the connected vibrator 24. During testing, a uniform vibration response is desirable because it ensures that all products 12, or all parts of a single product 12, are exposed to approximately equal vibration levels over the entire table 20.

A controller 44 is coupled to each of the solenoid valves 36 to manipulate the opening duration to control the output of each connected vibrator 24. A user interface 48 of the system 10 is configured to communicate with the controller 44. The user interface 48 can be a personal computer, touch screen, or other electronic input device configured to receive a target vibration strength input from a user and supply a corresponding signal to the controller 44. The target vibration strength is a uniform target vibration strength for the entire table 20. Once supplied with the target vibration strength input, and the supply pressure is available at the header 40, the controller 44 operates to maintain the target vibration strength uniformly across the table 20 so that any and all products 12 on the table 20 experience substantially uniform loading and stress.

In order to provide feedback to the controller 44, a plurality of accelerometers 52 are provided at the table 20, each being configured to measure local vibration strength at a corresponding portion of the table 20. Each of the accelerometers 52 is provided at a distinct region 20-1 to 20-4 of the table 20, of which there are four in the construction of FIG. 1. However, two, three, or more than four regions may be provided, and may be arranged in any desired manner. In the illustrated construction, a single vibrator 24 is coupled to the table 20 at each region 20-1 to 20-4, but multiple vibrators 24 can be provided at each region. The accelerometers 52 measure the vibration strength from the vibrators 24 which is actually present at each region of the table surface 16 and/or product(s) 12, rather than the vibration strength at the vibrators 24 themselves. This ensures that any transfer inefficiencies between the vibrators 24 and the table 20 do not introduce error to the test, and furthermore, enables vibrators 24 with different operating efficiencies (e.g., due to uneven wear over time) to produce substantially equal output. The accelerometers 52 can be coupled directly to the table 20 (e.g., the table surface 16), or alternately, can be coupled directly to the product(s) 12. In some constructions, accelerometers 52 may be coupled to both the table 20 and the product(s) 12. Although the accelerometers 52 measure vibration strength at the table 20, and not on the vibrators 24 themselves, independent control of the vibrator(s) 24 in each particular region is provided by the separate control loops (e.g., separate control loops for each vibrator 24 in the illustrated construction as only one vibrator 24 is positioned at each region of the table 20).

Figure 6:
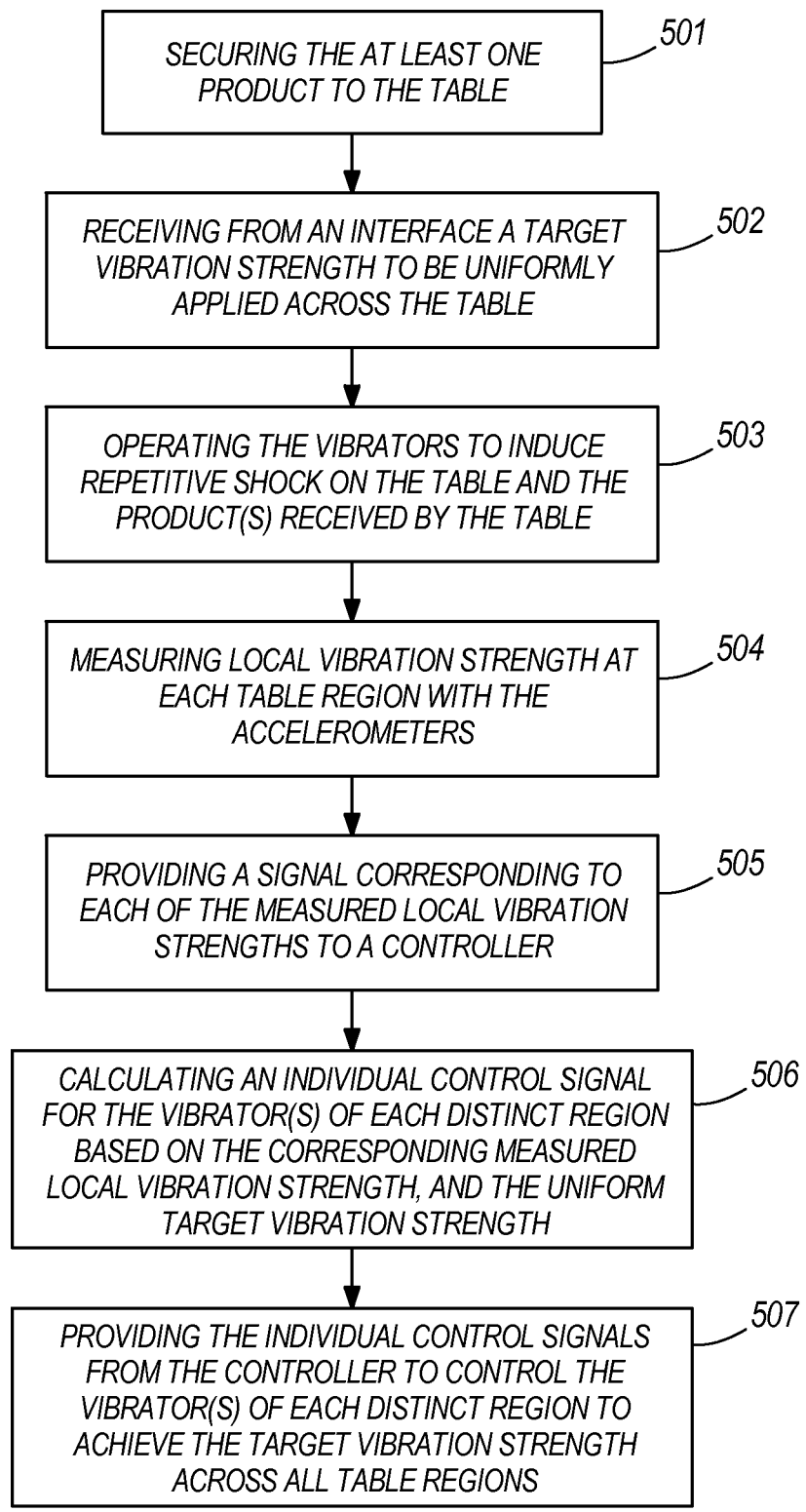
FIG. 6 is a flow diagram illustrating a method of operating the vibration testing system, according to one aspect of the invention.

In operation of the vibration testing system 10, a method as illustrated in FIG. 6 is carried out. First, the product(s) 12 to be tested are secured to the table 20 at step 501, and a target vibration strength to be uniformly applied across the table 20 is input from the interface 48 at step 502. The target vibration strength can be a single value or may be a time-based scheme of changing values, which are always uniform throughout the table 20. Then, the plurality of vibrators 24 is operated at step 503 to induce repetitive shock on the table 20 and the product(s) 12 received by the table 20. During operation of the vibrators 24, local vibration strength is measured at each of the plurality of distinct regions 20-1 to 20-4 of the table 20 with the plurality of accelerometers 52 at step 504. A signal corresponding to each of the measured local vibration strengths is provided at step 505 from each of the accelerometers 52 to the controller 44, which is programmed to calculate at step 506 an individual control signal for each vibrator 24 (or group of vibrators 24 in each region 20-1 to 20-4, if more than one) based on the measured local vibration strength and the target vibration strength. At step 507, an individual control signal is provided from the controller 44 to the vibrator(s) 24 of each region 20-1 to 20-4 to achieve the target vibration strength across the entire table 20, including all of the plurality of distinct regions 20-1 to 20-4. In the illustrated pneumatic system, the individual control signals are provided from the controller 44 to the individual electronically-controlled solenoid valves 36 corresponding to each vibrator 24. For example, if one of the accelerometers 52 measures a vibration strength less than the target vibration strength, the controller 44 manipulates the corresponding valve 36 to increase the amount of air supplied in each burst to the corresponding vibrator 24. The above-described control process occurs on a loop throughout the testing process to maintain the target vibration strength across all of the plurality of distinct regions 20-1 to 20-4 of the table 20.

It should be appreciated that the table 20, including the four distinct regions 20-1 to 20-4, is only one possible construction, and the invention is in no way limited to such a regional distribution. Other constructions can employ a table 20 having an alternate plurality of distinct regions of 2, 3, 4 or more distinct regions with at least one vibrator 24 and at least one accelerometer provided at each region. For example, the distinct regions and/or vibrator locations can be arranged in a regular two-dimensional grid pattern across the table 20, such as even quadrants or other sections, or in an irregular pattern. Examples of additional constructions of the invention are described in further detail below, focusing on the aspects differing from the system 10 and the method described above. Similar reference characters are used where appropriate.

Figure 2:
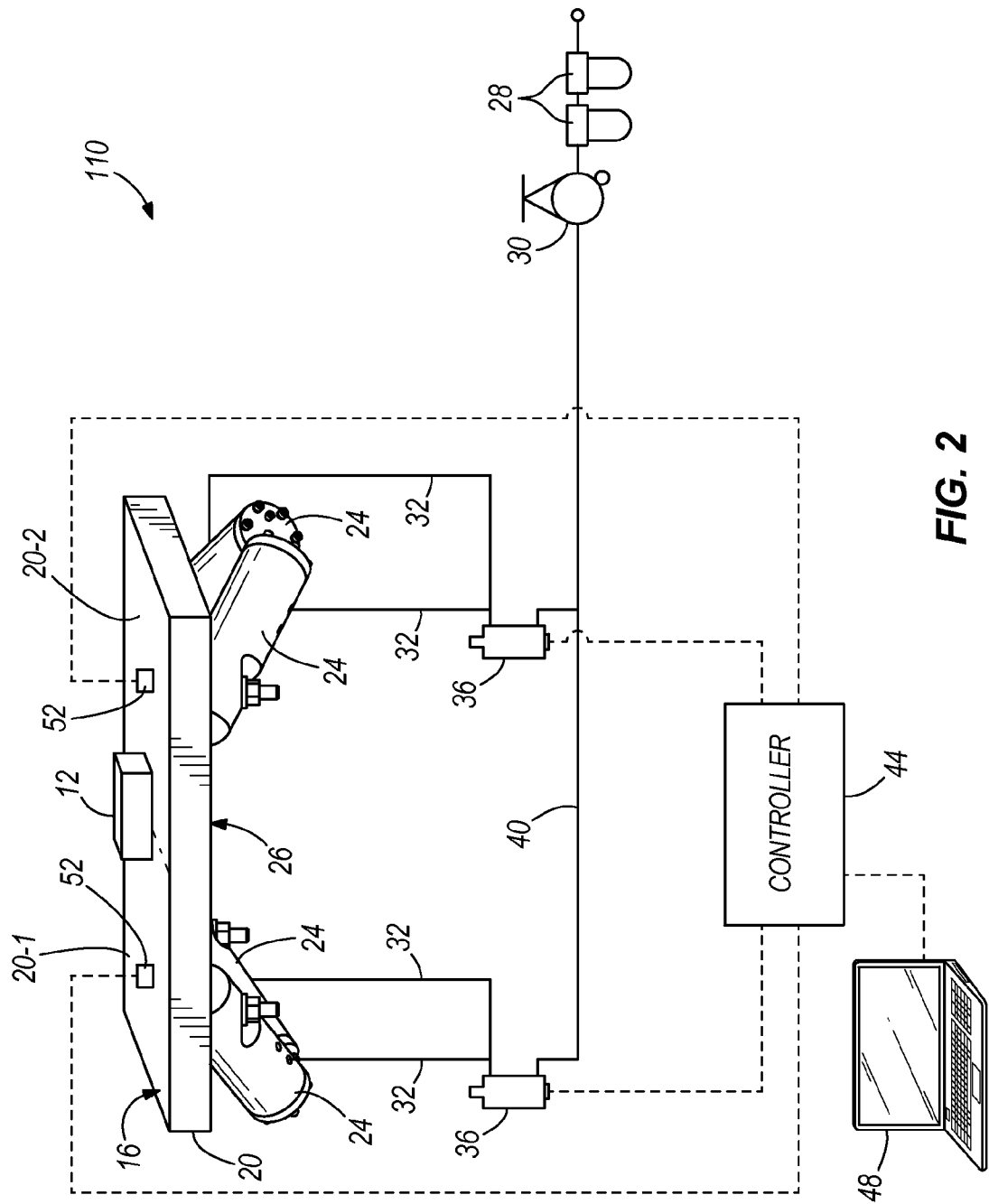
FIG. 2 is a schematic view of a vibration testing system, according to another construction of the invention.

FIG. 2 illustrates a vibration testing system 110 for performing a vibration or repetitive shock test on one or more products 12. With the exception of those aspects described below, the vibration testing system 110 and method of operating are consistent with the above description. Rather than four "quadrant" type regions, the table 20 is divided into two distinct regions 20-1 and 20-2 for feedback and control purposes. The regions 20-1 and 20-2 are simple rectangular halves of the table 20 such that the four vibrators 24 are divided into pairs, one pair of vibrators 24 in each region. Accelerometers 52, one in each region 20-1 and 20-2, measure vibration strength at each region of the table 20. Separate signals from the accelerometers 52 are sent to the controller 44. The controller 44 is programmed to calculate independent, region-specific control signals for the vibrator pairs (or vibrator groups of more than two per region in some constructions) based on the corresponding measured local vibration strength and the target vibration strength. An individual control signal is provided from the controller 44 to the vibrators 24 of each region 20-1, 20-2 to achieve the target vibration strength across the entire table 20, including all of the plurality of distinct regions 20-1, 20-2. Although each vibrator 24 does not have its own independent control loop, the vibration strength feedback is still taken directly from the table 20 (or the product(s) 12 on the table 20), and the vibrators 24 of separate regions are controlled with separate control signals.

Figure 3:
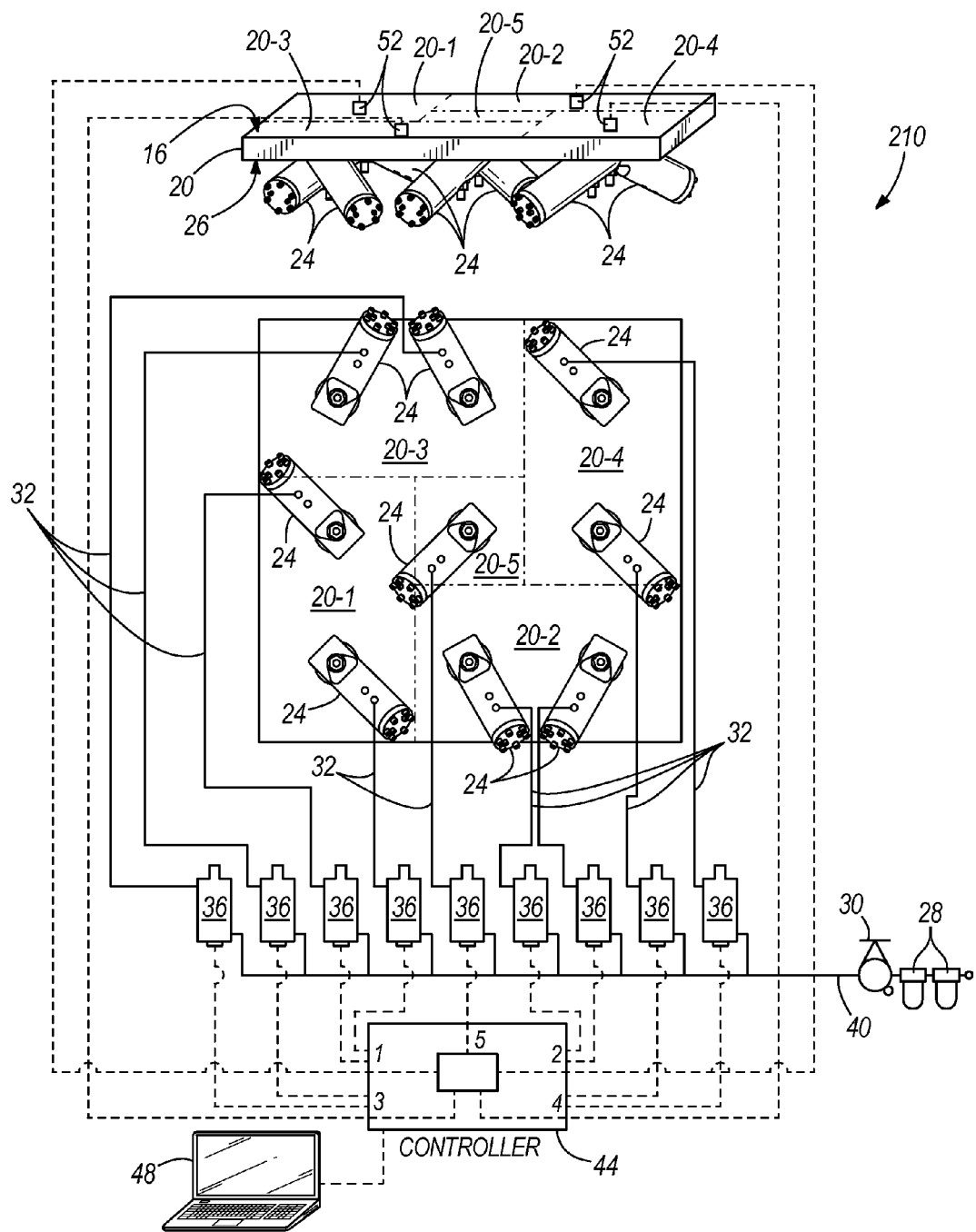
FIG. 3 is a schematic view of a vibration testing system, according to yet another construction of the invention.

FIG. 3 illustrates a vibration testing system 210 for performing a vibration or repetitive shock test on one or more products (not shown). With the exception of those aspects described below, the vibration testing system 210 and method of operating, are consistent with the above description of the vibration testing system 10 of FIG. 1. Rather than four "quadrant" type regions, the table 20 is divided into distinct regions including four rectangular "pinwheel" regions 20-1 to 20-4 around the outside and a central region 20-5 between the four pinwheel regions 20-1 to 20-4. In the illustrated construction, one pair of vibrators 24 are provided in each of the four pinwheel regions 20-1 to 20-4, and an additional vibrator 24 is positioned in the central region 20-5. One accelerometer 52 is provided at each of the four pinwheel regions 20-1 to 20-4, and no accelerometer is provided at the central region 20-5. The accelerometers 52 measure vibration strength at each of the pinwheel regions 20-1 to 20-4. Separate signals from the accelerometers 52 are sent to the controller 44. The controller 44 is programmed to calculate independent, region-specific control signals for the vibrator pairs (or vibrator groups of more than two per region in some constructions) of each of the pinwheel regions 20-1 to 20-4 based on the corresponding measured local vibration strength and the target vibration strength. An individual control signal is provided from the controller 44 to the vibrators 24 of each pinwheel region 20-1 to 20-4. The controller 44 is also programmed to calculate a control signal for the vibrator 24 in the central region 20-5 by averaging the signals from the four surrounding regions 20-1 to 20-4 (illustrated by the box and dashed connector lines within the controller 44) and comparing to the target vibration strength. The control signal based on the averaged vibration strength signals is provided to only the vibrator(s) 24 in the central region 20-5 which does not have its own dedicated accelerometer. In this way, the target vibration strength is achieved across the entire table 20, including all of the plurality of distinct regions 20-1 to 20-5. Although each vibrator 24 does not have its own independent control loop, the vibration strength feedback is still taken directly from the table 20 (or the product(s) on the table 20), and the vibrators 24 of separate regions are controlled with separate control signal.

Figure 4:
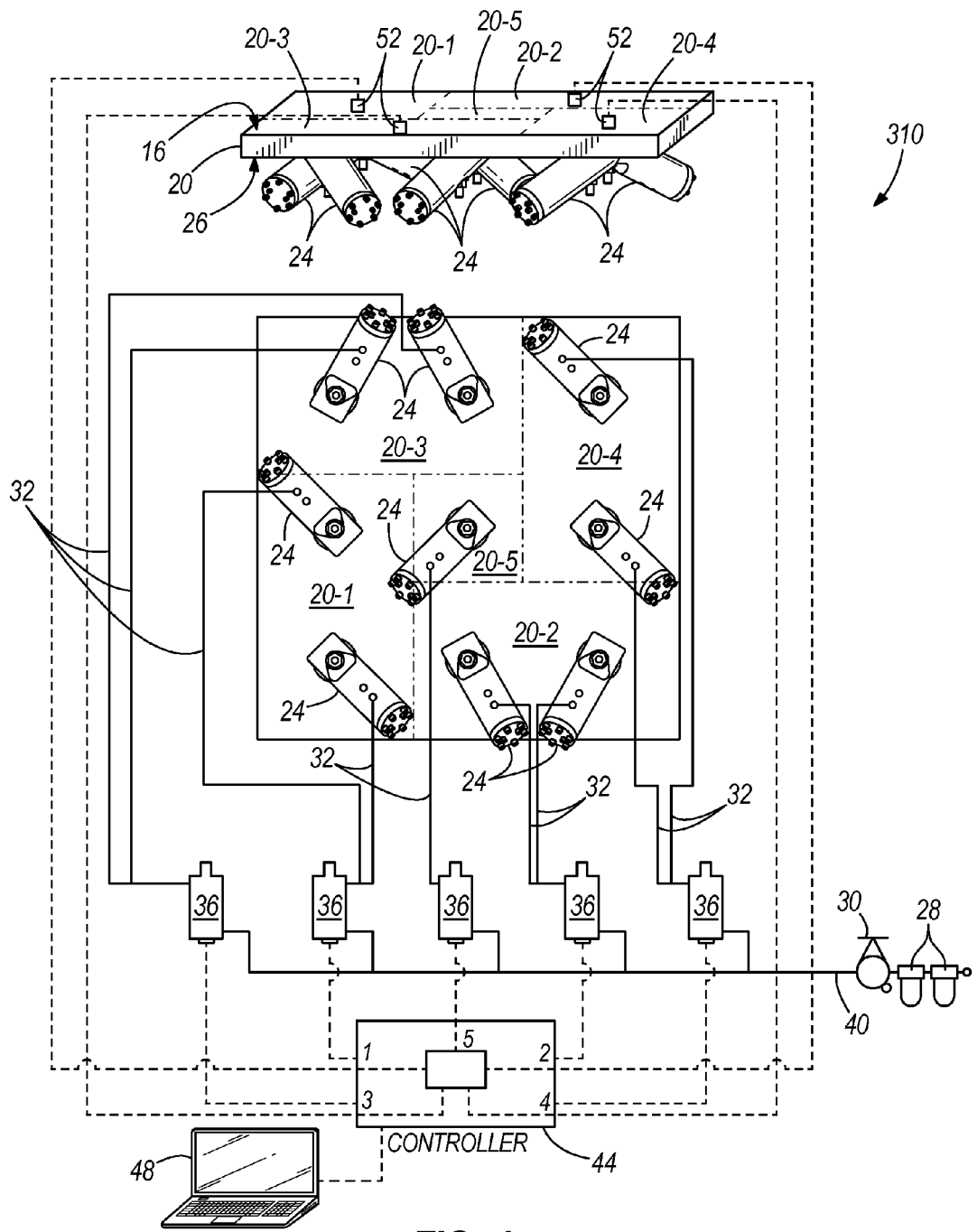
FIG. 4 is a schematic view of a vibration testing system, according to yet another construction of the invention.

FIG. 4 illustrates a vibration testing system 310 for performing a vibration or repetitive shock test on one or more products (not shown). The vibration testing system 310 of FIG. 4 is identical to the vibration testing system 210 of FIG. 3, with the exception that the pair of vibrators 24 in each of the regions 20-1 to 20-4 are coupled to a single valve 36. Thus, the method of operation includes sending a single control signal from the controller 44 to a single valve 36 for each region 20-1 to 20-5, and duplicative signals need not be sent to multiple valves 36. Of course, this concept can be applied to regions with more than two vibrators 24 in additional constructions.

Figure 5:
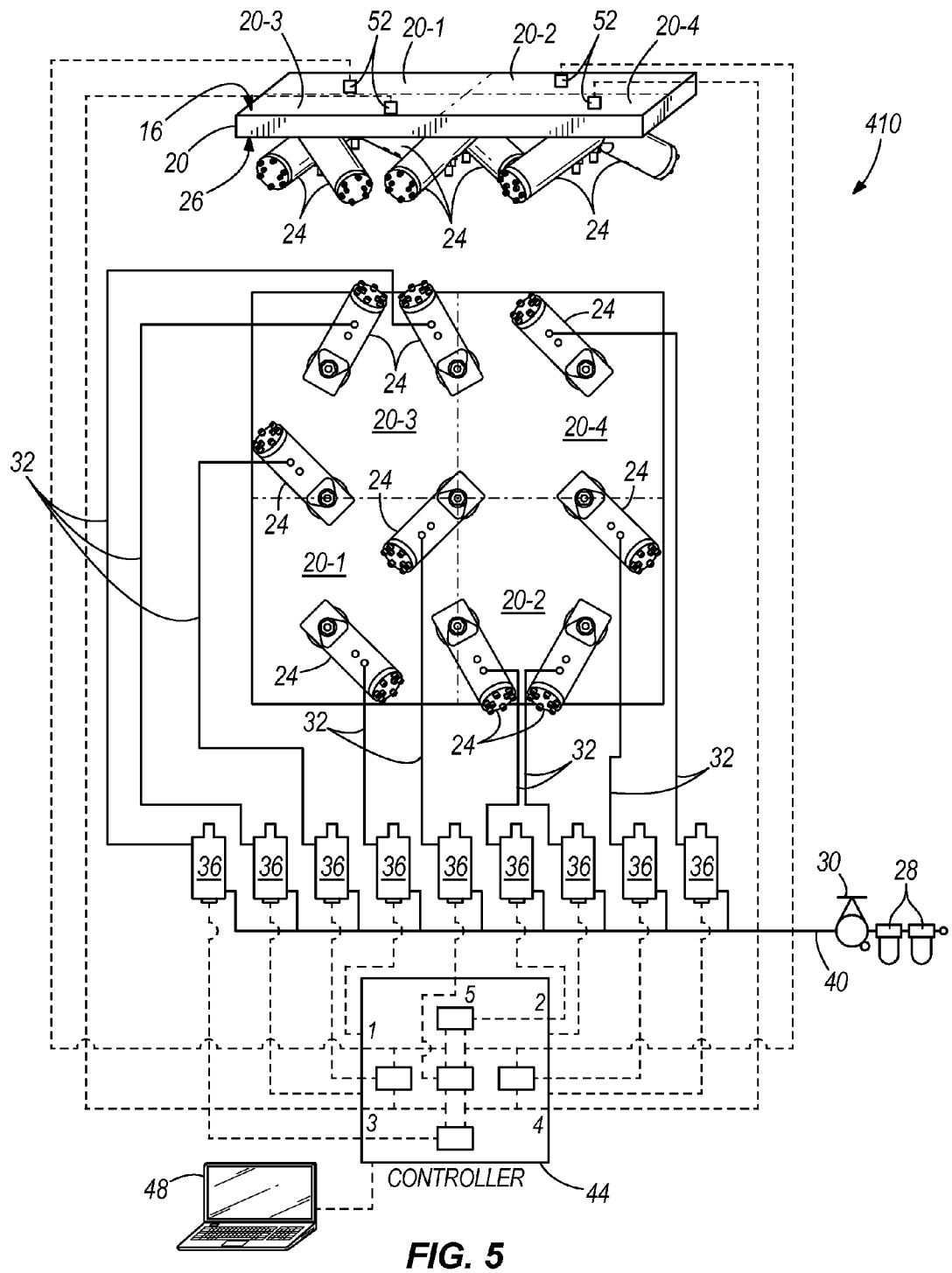
FIG. 5 is a schematic view of a vibration testing system, according to yet another construction of the invention.

FIG. 5 illustrates a vibration testing system 410 for performing a vibration or repetitive shock test on one or more products (not shown). The vibration testing system 410 and its method of operation combine various aspects of the vibration testing systems and methods described above. Reference to the above description is made with respect to the system components and their respective functions. The arrangement of vibrators 24 on the table 20 is similar to that shown in FIGS. 3 and 4. However, the table 20 is divided into four "quadrant" type regions 20-1 to 20-4 for feedback and control purposes. The regions 20-1 to 20-4 are simple rectangular quarters of the table 20. Thus, only a single vibrator 24 is provided wholly within each respective region 20-1 to 20-4, and the remaining vibrators 24 (five vibrators 24 in the illustrated construction) are positioned along borders B1, B2 that divide the regions 20-1 to 20-4. In other constructions, the distribution of vibrators 24 wholly within the regions 20-1 to 20-4 and on the borders B1, B2 can vary. Accelerometers 52, one in each region 20-1 to 20-4, measure vibration strength at each region of the table 20, and separate signals from the accelerometers 52 are sent to the controller 44. In the illustrated construction, the controller 44 is programmed to calculate independent, region-specific control signals for each of the vibrators 24. Because each vibrator 24 has its own independent control loop in the construction of FIG. 5, the output of each vibrator 24 is manipulated by a dedicated valve 36. In constructions where more than one vibrator 24 falls in the same region 20-1 to 20-4 or on the same border B1, B2 between the same regions 20-1 to 20-4, a unique control signal is calculated for the common pair or group of vibrators 24.

For the vibrators 24 wholly within one of the regions 20-1 to 20-4, the control signal is calculated based on the corresponding measured local vibration strength and the target vibration strength. For those vibrators 24 located on borders B1, B2 between two adjacent regions 20-1 to 20-4, the control signal is calculated based on the average of the measured local vibration strengths from the adjacent regions and the target vibration strength. Where a vibrator 24, such as the central vibrator 24 of FIG. 5, is positioned at an intersection of borders B1, B2 between more than two regions 20-1 to 20-4, the control signal is calculated based on the average of the measured local vibration strengths from all adjacent regions and the target vibration strength. In the illustrated construction, the control signal for the central vibrator 24 located at the intersection of the two borders B1, B2 is calculated based on an average of the measured local vibration strengths from all of the accelerometers 52. The boxes and dashed connector lines within the controller 44 illustrate the averaging of the respective signals from the accelerometers 52.

Although some of the vibrators 24 are controlled based on average measured vibration strengths from multiple accelerometers 52, the system 410 still has the advantages of taking the vibration strength feedback directly from the table 20 (or the product(s) on the table 20) and providing an individual region-specific control signal from the controller 44 to each vibrator 24 (or vibrator group) to achieve the target vibration strength across the entire table 20, including all of the plurality of distinct regions 20-1 to 20-4. In this context, the term region-specific denotes being specific to a particular region, or two or more particular regions where the vibrator 24 is located on a border B1, B2.

Figure 7:
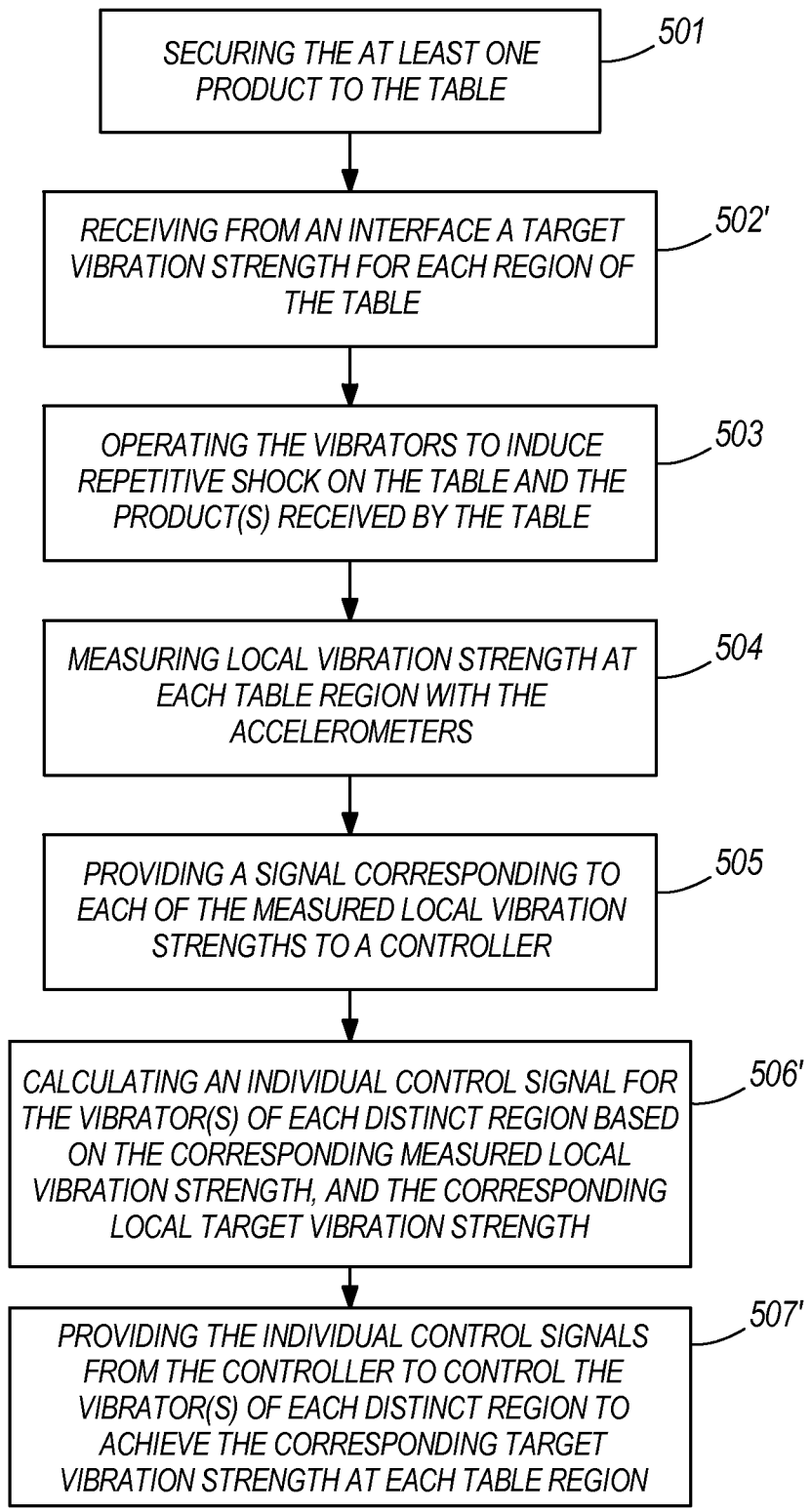
FIG. 7 is a flow diagram illustrating a method of operating the vibration testing system, according to another aspect of the invention.

Although the vibration testing systems and methods described above can provide particular advantage in obtaining vibration uniformity throughout multiple regions of a table, the vibration testing systems can provide further advantage when operated according to another method, in which uniformity across the entire table is not necessarily desired. A flow diagram for such a method is provided in FIG. 7. The structure of each of the vibration testing systems can be substantially identical to that described above. However, the controller 44 of any of the systems can be configured to receive a target vibration strength for each distinct table region (step 502'), where the targets can be different for at least two distinct table regions. The multiple different target vibration strengths can be multiple different fixed values, or multiple different time-based schemes. The target vibration strengths can be different for any number of the distinct regions, up to all of the distinct regions of a particular table. Because the vibration testing systems all have independent control vibrator loops or "multi-point control" for the different table regions, a vibration testing method can be set up and operated for uniform vibration response, or any particular vibration response scheme desired.

To carry out a test with intentionally non-uniform vibration strength at various regions, the only differences from the operation methods described above are that the controller receives multiple different vibration strength targets corresponding to two or more distinct regions (step 502'), and the controller then calculates the independent control signals for the vibrator(s) of the different table regions based on the measured local vibration strengths and the various corresponding target vibration strengths (step 506'), which are not necessarily all equal. The individual control signals are then provided from the controller to control the vibrator(s) of each distinct region to achieve the corresponding target vibration strength at each table region (step 507'). This vibration testing system and method can be used to achieve specific vibration strength targets, which vary between different table regions, so that different portions of a single product can be exposed to different vibration levels for much more advanced testing. Alternately, several separate products can be secured to the separate table regions and exposed to different vibration levels at the same time during a single operation of the system, resulting in improved testing efficiency.

Figure 8:
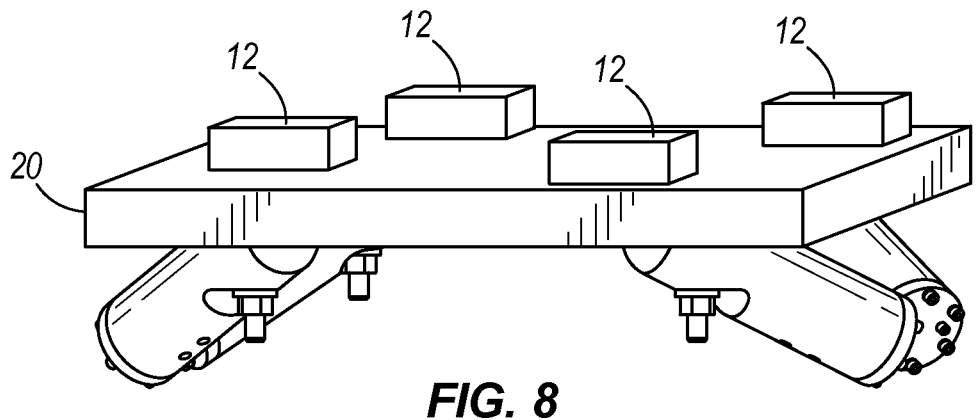
FIG. 8 is a schematic illustration of a test setup for multiple products of substantially identical load.
Figure 9:
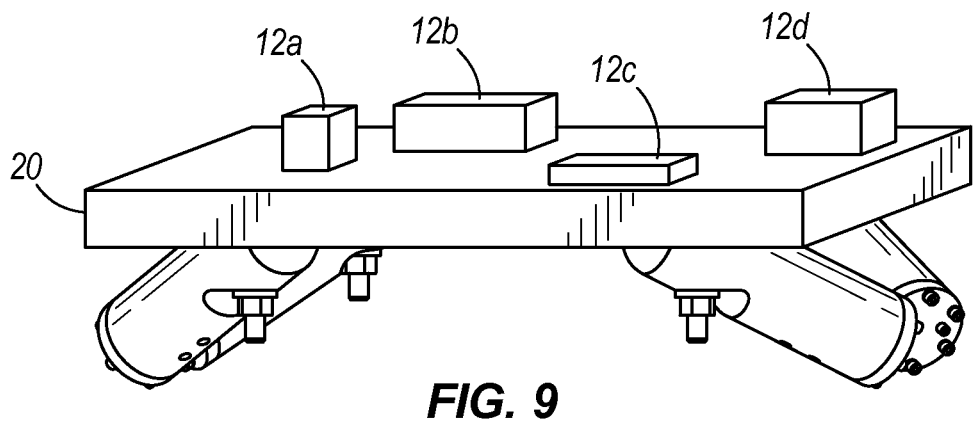
FIG. 9 is a schematic illustration of a test setup for multiple products of substantially varied load.
Figure 10:
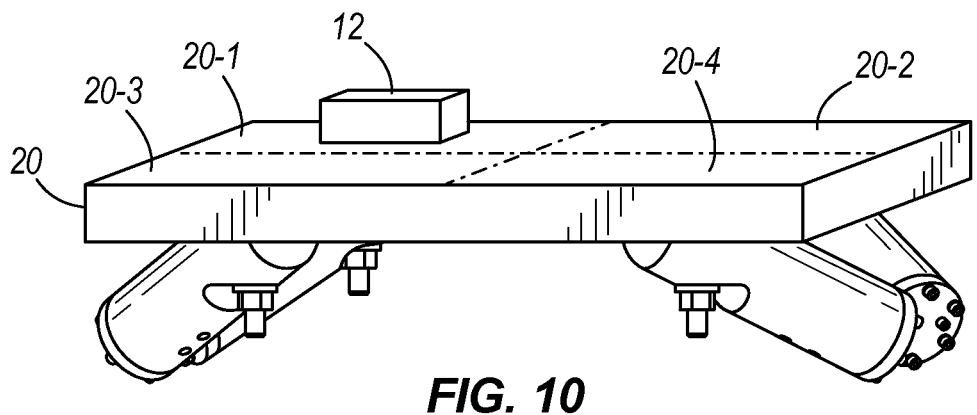
FIG. 10 is a schematic illustration of a test setup for a single product defined within one table region.

FIGS. 8-10 illustrate the table 20 set up in a variety of ways. In FIG. 8, a plurality of products 12 are distributed (e.g., evenly distributed) across the table 20. The products 12 can be in any or all regions, and the regions may be divided in any desired manner. According to the method of FIG. 6, all of the products 12 can be assured of experiencing substantially identical vibration stimulation. Operated according to the method of FIG. 7, two or more of the products 12 can be tested simultaneously with substantially different vibration stimulation according to different preset targets. In FIG. 9, a plurality of products 12a-12d are distributed (e.g., evenly distributed) across the table 20. The products 12 can be in any or all regions, and the regions may be divided in any desired manner. According to the method of FIG. 6, all of the products 12a-12d can be assured of experiencing substantially identical vibration stimulation, despite the disparity in size, shape, weight, etc. Operated according to the method of FIG. 7, two or more of the products 12a-12d can be tested simultaneously with substantially different vibration stimulation according to different preset targets. In FIG. 10, a single product 12 is provided on the table 20. The product 12 is positioned in one region 20-1 of the table 20. Operated according to the method of FIG. 7, the one loaded region 20-1 can be used to carry out a test on the product 12 while the other table regions 20-2, 20-2, 20-3 can be set to a minimal target value just enough to preserve 6 degree-of-freedom operation (i.e., a minimal amount to prevent these vibrators from obstructing the operation of the vibrators associated with the loaded region). Thus, the test can be carried out with less expenditure of energy (e.g., airflow), and wear and tear is reduced on the remaining vibrators.

It will be understood by those of skill in the art that a target vibration strength and a measured vibration strength, as referred to herein, can be acceleration taken along a particular selected axis in an x-y-z coordinate space, or alternately, can be "total acceleration" obtained as an average of acceleration in the three axes of the x-y-z coordinate space. The accelerometers referred to herein can encompass single-axis or multi-axis accelerometers, and the vibration strength measured to control the vibrators of an individual table region can be provided from one accelerometer or averaged from multiple accelerometers, as long as region-specific control loops are provided to enable multi-point control in which the vibration level at every table region can be precisely controlled, whether uniform or at different predetermined levels.

Also, as understood by those of skill in the art, achieving a target vibration strength need not refer to exactly achieving a single value of impact strength repeatedly, as vibrators can be controlled according to known techniques to be stimulated with an intentional frequency and amplitude randomization about the target in order to obtain a desirable vibration response. Operation in this way does not affect the above description of achieving a target vibration strength, as it will be understood that a target vibration strength is achieved when the output can be intentionally randomized about the target value for the purpose of obtaining a desirable vibration response.

Various features and advantages of the invention are set forth in the following claims.

What is claimed is:

1. A method of operating a repetitive shock vibration testing system including a table configured to receive at least one product for testing, a plurality of vibrators coupled to the table and operable to impact the table with a range of impact strengths, and a plurality of accelerometers, the method comprising:

providing the table with a plurality of distinct regions;

providing each of the plurality of distinct regions with at least one vibrator of the plurality of vibrators and at least one accelerometer of the plurality of accelerometers;

securing the at least one product to the table;

setting a target vibration strength for each of the plurality of distinct regions;

operating the plurality of vibrators to repeatedly impact the table to induce repetitive shock on the table and the at least one product received by the table;

measuring local vibration strength at each of the plurality of distinct regions with the corresponding at least one accelerometer of the plurality of accelerometers;

providing a signal corresponding to each of the measured local vibration strengths to a controller;

calculating an individual control signal for the at least one vibrator of each distinct region based on the corresponding measured local vibration strength and the corresponding target vibration strength; and providing the individual control signals from the controller to control the at least one vibrator of each distinct region to achieve the target vibration strength at each of the plurality of distinct regions of the table.

2. The method of claim 1, further comprising repeating each of the following steps throughout operation of a repetitive shock test on the at least one product to maintain the target vibration strength at each of the plurality of distinct regions of the table:

measuring local vibration strength at each of the plurality of distinct regions with the corresponding at least one accelerometer of the plurality of accelerometers;

providing a signal corresponding to each of the measured local vibration strengths to the controller;

calculating an individual control signal for the at least one vibrator of each distinct region based on the corresponding measured local vibration strength and the corresponding target vibration strength; and providing the individual control signals from the controller to control the at least one vibrator of each distinct region to achieve the target vibration strength at each of the plurality of distinct regions of the table.

3. The method of claim 1, wherein each of the plurality of accelerometers measures local vibration strength directly from the table.

4. The method of claim 1, wherein at least one of the plurality of accelerometers measures local vibration strength directly from the at least one product.

5. The method of claim 1, wherein each of the plurality of accelerometers measures local vibration strength directly from the at least one product.

6. The method of claim 1, wherein each of the plurality of distinct regions is provided with a single one of the plurality of vibrators.

7. The method of claim 1, wherein the target vibration strength for at least two of the plurality of distinct regions of the table are different.

8. The method of claim 1, wherein operating the plurality of vibrators to repeatedly impact the table to induce repetitive shock on the table and the at least one product received by the table includes delivering bursts of pressurized air through a plurality of electronically controlled valves, and wherein providing the individual control signals from the controller to control the at least one vibrator of each distinct region to achieve the target vibration strength at each of the plurality of distinct regions of the table includes providing the individual control signals to the corresponding plurality of electronically-controlled valves.

9. The method of claim 8, further comprising controlling no more than one vibrator with each of the plurality of electronically-controlled valves.

10. The method of claim 8, further comprising controlling multiple vibrators of a particular one of the plurality of distinct regions with a single one of the plurality of electronically-controlled valves.

11. The method of claim 1, wherein the target vibration strength is uniform for all the plurality of distinct regions of the table.

12. The method of claim 11, further comprising
providing an additional distinct region of the table with at least one additional vibrator and without any of the plurality of accelerometers;

calculating an individual control signal for the at least one additional vibrator based on the measured local vibration strengths at adjacent ones of the plurality of distinct regions and the uniform target vibration strength; and providing the individual control signal from the controller to control the at least one additional vibrator.

13. The method of claim 11, further comprising
providing at least one additional vibrator on a boundary between adjacent ones of the plurality of distinct regions;

calculating an individual control signal for the at least one additional vibrator based on the measured local vibration strengths at the adjacent ones of the plurality of distinct regions and the uniform target vibration strength; and providing the individual control signal from the controller to control the at least one additional vibrator.

14. A repetitive shock vibration testing system comprising:
a table configured to receive at least one product for testing, the table having a plurality of distinct regions;

a plurality of vibrators attached to the table and configured to impact the table with a range of impact strengths to induce repetitive shock on the table, wherein the plurality of vibrators are arranged with at least one vibrator in each distinct region;

a plurality of accelerometers, wherein each of the plurality of accelerometers is configured to measure local vibration strength at one of the plurality of distinct regions; and a controller coupled to the plurality of vibrators and the plurality of accelerometers, the controller being programmed to receive a target vibration strength for each of the plurality of distinct regions of the table, to receive a signal corresponding to each of the measured local vibration strengths, to calculate a plurality of independent, region-specific vibrator control signals, each based on the corresponding measured local vibration strength and the corresponding target vibration strength, and to provide the plurality of vibrator control signals to control the plurality of vibrators to achieve the target vibration strength at each of the plurality of distinct regions of the table.

15. The repetitive shock vibration testing system of claim 14, wherein each of the plurality of accelerometers is secured directly to the table.

16. The repetitive shock vibration testing system of claim 14, further comprising a plurality of electronically controlled valves configured to deliver bursts of pressurized air to corresponding ones of the plurality of vibrators, wherein each of the plurality of electronically-controlled valves is coupled with the at least one vibrator of one of the distinct regions to control the output of the at least one vibrator, and wherein each of the plurality of electronically-controlled valves is configured to receive one of the plurality of vibrator control signals to manipulate the output of the at least one vibrator of the corresponding distinct region.

17. The repetitive shock vibration testing system of claim 14, further comprising a user interface configured to receive the target vibration strength for each of the plurality of distinct regions and to communicate the target vibration strength for each of the plurality of distinct regions to the controller.

18. The repetitive shock vibration testing system of claim 14, wherein a single one of the plurality of vibrators is positioned at each distinct region.

19. The repetitive shock vibration testing system of claim 14, wherein at least one of the plurality of distinct regions has multiple vibrators of the plurality of vibrators positioned therein.

20. The repetitive shock vibration testing system of claim 14, wherein the table includes an additional distinct region with at least one additional vibrator and without any of the plurality of accelerometers, and the controller is further configured to calculate an individual control signal for the at least one additional vibrator based on the measured local vibration strengths and the target vibration strengths of adjacent ones of the plurality of distinct regions and to provide the individual control signal from the controller to control the at least one additional vibrator.

21. The repetitive shock vibration testing system of claim 14, further comprising at least one additional vibrator coupled to the table and positioned on a boundary between adjacent regions of the plurality of distinct regions.

22. The repetitive shock vibration testing system of claim 21, wherein the controller is configured to control the at least one additional vibrator in relation to an average of local vibration strengths measured at the adjacent regions.

23. The repetitive shock vibration testing system of claim 14, wherein the target vibration strength for at least two of the plurality of distinct regions of the table are different.

24. The method of claim 1, wherein the table defines a surface to which the at least one product is secured and wherein the surface is subdivided into the plurality of distinct regions.

25. The repetitive shock vibration testing system of claim 14, wherein the table defines a surface to which the at least one product for testing is received and wherein the surface is subdivided into the plurality of distinct regions.

26. The method of claim 1, wherein the table moves with six degrees-of-freedom during operation of the plurality of vibrators.

27. The repetitive shock vibration testing system of claim 14, wherein the table is mounted to provide movement in six degrees-of-freedom in response to impacts from the plurality of vibrators.

28. The method of claim 1, wherein each of the plurality of vibrators provides impact in a direction non-orthogonal to the table.

29. The repetitive shock vibration testing system of claim 14, wherein each of the plurality of vibrators is oriented non-orthogonally to the table.

* * * * *